United States Patent Office 3,383,353
Patented May 14, 1968

3,383,353
POLYAMIDE COMPOSITION
Michio Goto, Mihara-shi, Japan, assignor to Teijin Limited, Kita-ku, Osaka, Japan, a corporation of Japan
No Drawing. Filed Apr. 6, 1966, Ser. No. 540,531
Claims priority, application Japan, July 8, 1965, 40/41,242
4 Claims. (Cl. 260—45.75)

ABSTRACT OF THE DISCLOSURE

Polyamide resins are made stable against light, heat and oxidative degradation by the incorporation of a compound of the formula

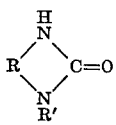

wherein R is phenylene, 1-methylphenylene or 1,3-dimethylphenylene and R' is hydrogen, methyl or phenyl. The optional addition of cupric chloride, copper iodide or manganese chloride improve the above properties.

---

This invention relates to polyamide compositions and more particularly to polyamide compositions which are resistant to the deteriorating effects of light, oxygen and heat.

It has been proposed to improve the resistance of polyamide compositions and articles to the effect of light and heat by employment of stabilizers such as aromatic amines, phenyl derivatives, 2-mercaptobenzimidazole, organic phosphoric compounds and inorganic metal salts. Although these stabilizers are generally effective for imparting resistance of the polyamide against light deterioration, they are not entirely satisfactory in applications where a high degree of heat resistance is required such as in the production of tire yarns and the like.

I have found that when an imidazolone represented by the general formula

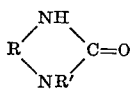

in which R is a substituted or unsubstituted aromatic nucleus and R' is hydrogen, alkyl, or aryl; is incorporated in polyamide compositions, that the resistance of the resulting polyamide compositions to light and oxygen is considerably enhanced. More significant, however, is the fact that the composition shows very good stability to heat, thereby making use especially attractive in the production of tire yarns and related articles requiring a high degree of heat stability.

A preferred type of stabilizers to be used in the present invention are represented by the formula

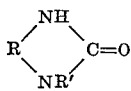

wherein R is a phenylene radical, a 1-methyl phenylene or a 1,3-dimethyl phenylene radical, and R' is hydrogen, methyl or phenyl. A particularly suitable compound for use in the present invention is benzimidazolone which is represented by the formula

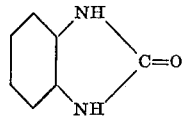

The stabilizing agents according to the present invention may be employed in an amount of about 0.05 to 3.0% by weight based upon the weight of polyamide. Although amounts in excess of 3.0% by weight may be employed, I have noted no marked improvement of the stability of the polyamides by employing such excessive amounts.

Although the imidazolones of the present invention produce satisfactory resistance of polyamides against heat and light, they are advantageously employed, however, in combination with other well known stabilizers for polyamides, for example, metallic salts such as salts of copper manganese, and tin. Merely as illustrative, there may be employed stabilizers such as copper chloride, copper iodide, copper acetate, manganese chloride, manganese acetate and tin chloride. In addition, there may be employed aromatic amines, phenyl derivatives, 2-mercaptobenzimidazole, organic phosphoric compounds, etc. When these stabilizers are employed together with the stabilizers of the present invention, they are employed in an amount of about 0.001 to 0.01% by weight.

The stabilizers of the present invention may be added either before or during the polymerization of the polyamide or before or during the shaping operations and the manner of addition is not critical. The following examples will illustrate the invention.

EXAMPLE 1

To 100 parts by weight e-caprolactam were added 1 part by weight benzimidazolone, 0.01 part cupric chloride and 1.5 parts water. They were polymerized by the reaction for about three hours under autogenous pressure and thereafter were polymerized for about three hours in an $N_2$ gas stream under normal pressure. The polymerized substances were then made into chips and were spun after the monomer was extracted and the polymers dried. The obtained filament was left in the air for about four hours at a temperature of about 180° C. and thereafter the change of strength was measured and compared with filaments which had no cupric chloride added and also to filaments with no stabilizers added. The decrease of the strength was only about 5 percent while the decrease of the strength of the filament containing no cupric chloride was about 18 percent. The filament containing no stabilizing agent at all resulted in a decrease of about 65 percent in strength.

EXAMPLE 2

To e-caprolactam were added 0.5 part by weight of benzimidazolone, 0.01 part by weight of copper iodide, 0.1 part by weight of potassium iodide, and were polymerized and spun in the same manner as in Example 1. The decrease of strength of the thus obtained yarn for the tire cord having been left in the air for four hours at a temperature of 180° C. was only 3 percent and the result of the decrease in the case of leaving the same in the air for ten hours at a temperature of 180° C. was only about 12 percent.

EXAMPLE 3

To e-caprolactam were added 0.05 part benzimidazolone, 0.001 part by weight of manganese chloride, and 0.0005 part by weight of copper acetate and were polymerized and spun utilizing the same procedure as in Example 1. The produced nylon filaments were illuminated by a Fade-Ometer for one hundred hours and the decrease of the strength was measured and found to be about 12 percent. Nylon filaments with no manganese chloride added decreased in strength by about 23 percent. Nylon filaments containing no added stabilizers showed a 68 percent decrease in strength.

Although certain preferred embodiments of the invention have been disclosed for purpose of illustration, it will be evident that various changes and modifications may be made therein without departing from the scope and spirit of the invention.

I claim:

1. A stabilized polyamide composition which comprises a synthetic linear polyamide and a compound of the formula

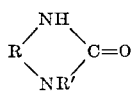

wherein R is phenylene, 1-methylphenylene or 1,3-dimethylphenylene and R' is hydrogen, methyl or phenyl.

2. Stabilized polyamide according to claim 1 wherein said imidazolone compound is benzimidazolone.

3. Stabilized polyamide composition according to claim 1 wherein said polyamide is poly-e-caproamide and wherein said imidazolone compound is employed in an amount of about 0.05 to 3.0% by weight based upon the weight of the polyamide.

4. Stabilized polyamide composition according to claim 3 having incorporated therein cupric chloride, copper iodide or manganese chloride.

References Cited

UNITED STATES PATENTS

| | | | |
|---|---|---|---|
| 2,630,421 | 3/1953 | Stamatoff | 260—45.75 |
| 2,705,227 | 3/1955 | Stamatoff | 260—45.75 |

DONALD CZAJA, *Primary Examiner.*

V. P. HOKE, *Assistant Examiner.*